US012645773B2

(12) United States Patent
Jaini et al.

(10) Patent No.:  US 12,645,773 B2
(45) Date of Patent:  Jun. 2, 2026

(54) FLASH TOKEN USING XR-AVATAR EXTRACTED SYNTHETIC AI METADATA

(71) Applicant: Bank of America Corporation, Charlotte, NC (US)

(72) Inventors: Yugandhar Jaini, Hyderabad (IN); Pushkar Taneja, Hyderabad (IN); Durga Prasad Kutthumolu, Hyderabad (IN); Subburathinam Krishnan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 219 days.

(21) Appl. No.: 18/583,218

(22) Filed: Feb. 21, 2024

(65) Prior Publication Data

US 2025/0265318 A1      Aug. 21, 2025

(51) Int. Cl.
*G06F 21/31*       (2013.01)
*G06T 19/00*      (2011.01)

(52) U.S. Cl.
CPC .......... *G06F 21/316* (2013.01); *G06T 19/006* (2013.01); *G06F 2221/2113* (2013.01)

(58) Field of Classification Search
CPC .......... G06F 21/316; G06F 2221/2113; G06F 21/32; G06T 19/006

(Continued)

(56) References Cited

U.S. PATENT DOCUMENTS 11,580,243 B2    2/2023  Collart
11,657,852 B1    5/2023  Zavesky et al.

(Continued)

FOREIGN PATENT DOCUMENTS

CN      113994385 A    1/2022
KR    20230043179 A    3/2023

(Continued)

OTHER PUBLICATIONS

Aymerich-Freanch, Laura, et al. Object Touch by a Humanoid Robot Avatar Includes Haptic Sensation in the Real Hand; Journal of Computer-Mediated Communication 22 pp. 215-230; 2017.

(Continued)

*Primary Examiner* — Jacob Lipman
(74) *Attorney, Agent, or Firm* — Banner & Witcoff, Ltd.

(57)                ABSTRACT

Secure user identification and transaction authentication are disclosed. Using an Autonetics true touch sensation engine, AI to identifies and extracts unique human/avatar behavior metadata. This enables precise user authentication for transactions or token reset processes. An avatar touch sensor interface or other extended reality (XR) mechanisms to start user interaction, prompting for traditional PIN authentication. After successful first authentication, it further analyzes the syngeneic avatar behavior metadata, using data collection methods to strengthen security measures. With Hybrid Capture Input (HCI) technology, user behavior is verified to align with pre-established unique behavioral profile(s), to confirm user identity. This self-improving system adapts authentication algorithms dynamically, based on user interaction with the avatar, to create personalized and secure authentication processes. Integrating syngeneic avatar behavior metadata with true touch sensation engineering presents a novel approach to PIN security systems, offering a dual-layer security mechanism and representing a significant leap in adaptive AI authentication technologies.

20 Claims, 7 Drawing Sheets

(58) Field of Classification Search

USPC ............................................................. 726/7

See application file for complete search history.

(56) References Cited

U.S. PATENT DOCUMENTS

| | | | |
|---|---|---|---|
| 11,860,981 B2 | 1/2024 | Yallen et al. | |
| 2014/0237587 A1* | 8/2014 | Forbes | G06F 21/32 |
| | | | 726/18 |
| 2015/0073907 A1* | 3/2015 | Purves | G06Q 20/384 |
| | | | 705/14.58 |
| 2020/0028843 A1* | 1/2020 | Watson | G06F 3/011 |
| 2022/0083585 A1 | 3/2022 | Evans | |
| 2022/0258049 A1 | 8/2022 | Kanani | |
| 2022/0343923 A1 | 10/2022 | Todorov et al. | |
| 2023/0090253 A1 | 3/2023 | Meadows et al. | |
| 2023/0104514 A1 | 4/2023 | Chen et al. | |
| 2023/0120772 A1 | 4/2023 | Zavesky et al. | |
| 2023/0230041 A1 | 7/2023 | Kim | |
| 2023/0298244 A1 | 9/2023 | Chan et al. | |
| 2023/0315817 A1 | 10/2023 | Yallen et al. | |
| 2023/0336804 A1 | 10/2023 | Welch et al. | |
| 2023/0418921 A1* | 12/2023 | Safary | G06F 21/33 |

FOREIGN PATENT DOCUMENTS

| | | | |
|---|---|---|---|
| KR | 20230114091 A | 8/2023 | |
| KR | 20230127613 A | 9/2023 | |
| WO | 2023056225 A2 | 4/2023 | |
| WO | 2023122182 A1 | 6/2023 | |

OTHER PUBLICATIONS

Carrozza, M. C.., et al. Design of a Cybernetic Hand for Perception and Action; Biological Cybernetics; 2006.

Morris, Alexis, et al.; Toward Mixed Reality Hybrid Objects with IoT Avatar Agents; 2020 IEEE International Conference on Systems, Man, and Cybernetics, Toronto, Ontario, Canada, pp. 766-773; 2020.

Rochoiw, Andre, et al. Attention-Based VR Facial Animation with Visual Mouth Camera Guidance for Immersive Telepresence Avatars; Dec. 15, 2023.

Trujillo, Amaury, et al; Toward Blockchain-based Fashion Wearables in the Metaverse—the Case of Decentraland; Jul. 3, 2023.

* cited by examiner

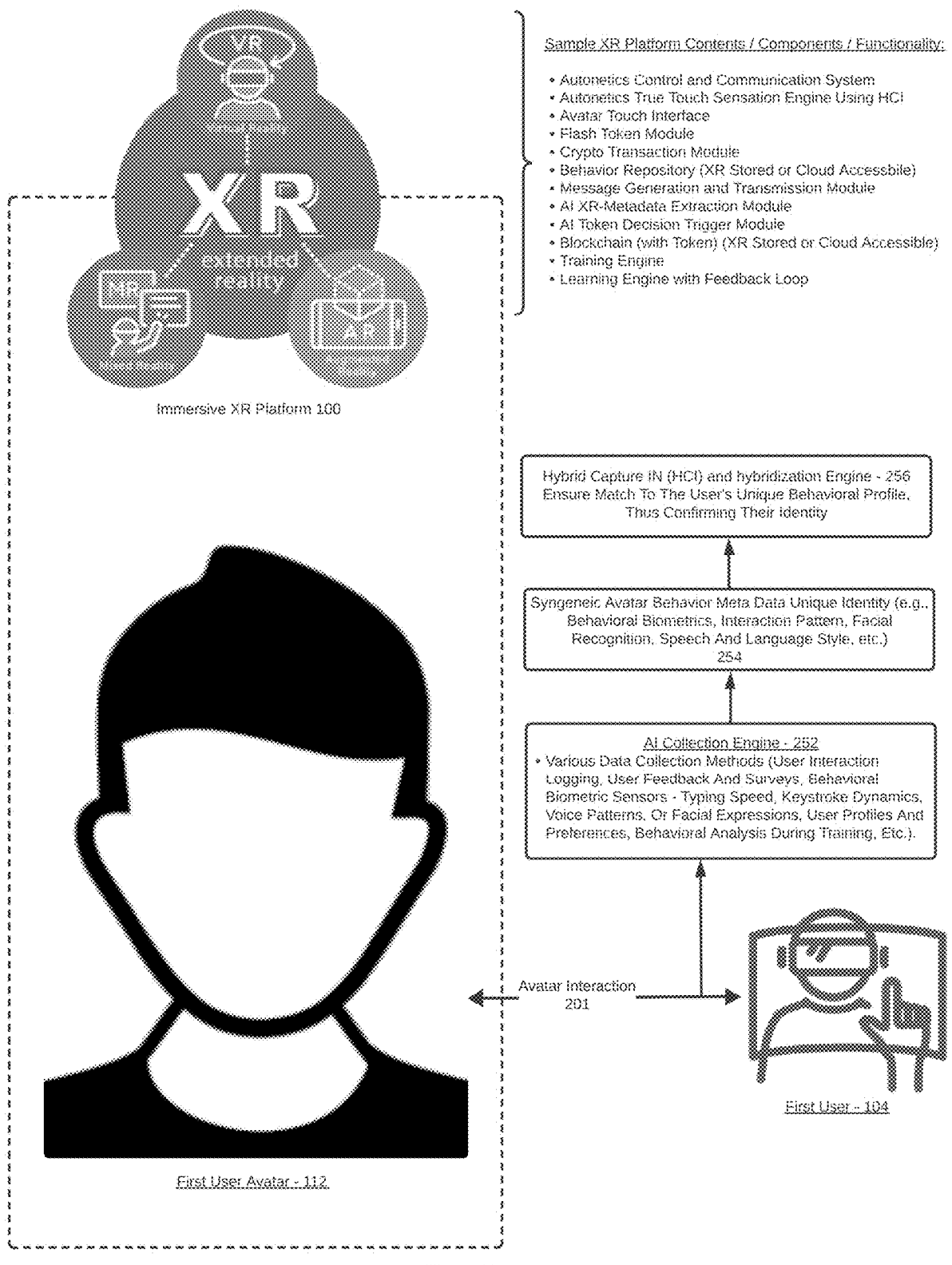

Immersive XR Platform 100

Sample XR Platform Contents / Components / Functionality:

- Autonetics Control and Communication System
- Autonetics True Touch Sensation Engine Using HCI
- Avatar Touch Interface
- Flash Token Module
- Crypto Transaction Module
- Behavior Repository (XR Stored or Cloud Accessbile)
- Message Generation and Transmission Module
- AI XR-Metadata Extraction Module
- AI Token Decision Trigger Module
- Blockchain (with Token) (XR Stored or Cloud Accessible)
- Training Engine
- Learning Engine with Feedback Loop Hybrid Capture IN (HCI) and hybridization Engine - 256
Ensure Match To The User's Unique Behavioral Profile,
Thus Confirming Their Identity Syngeneic Avatar Behavior Meta Data Unique Identity (e.g.,
Behavioral Biometrics, Interaction Pattern, Facial
Recognition, Speech And Language Style, etc.)
254

AI Collection Engine - 252
- Various Data Collection Methods (User Interaction
Logging, User Feedback And Surveys, Behavioral
Biometric Sensors - Typing Speed, Keystroke Dynamics,
Voice Patterns, Or Facial Expressions, User Profiles And
Preferences, Behavioral Analysis During Training, Etc.).

Avatar Interaction
201

First User - 104

First User Avatar - 112

FIG. 2A

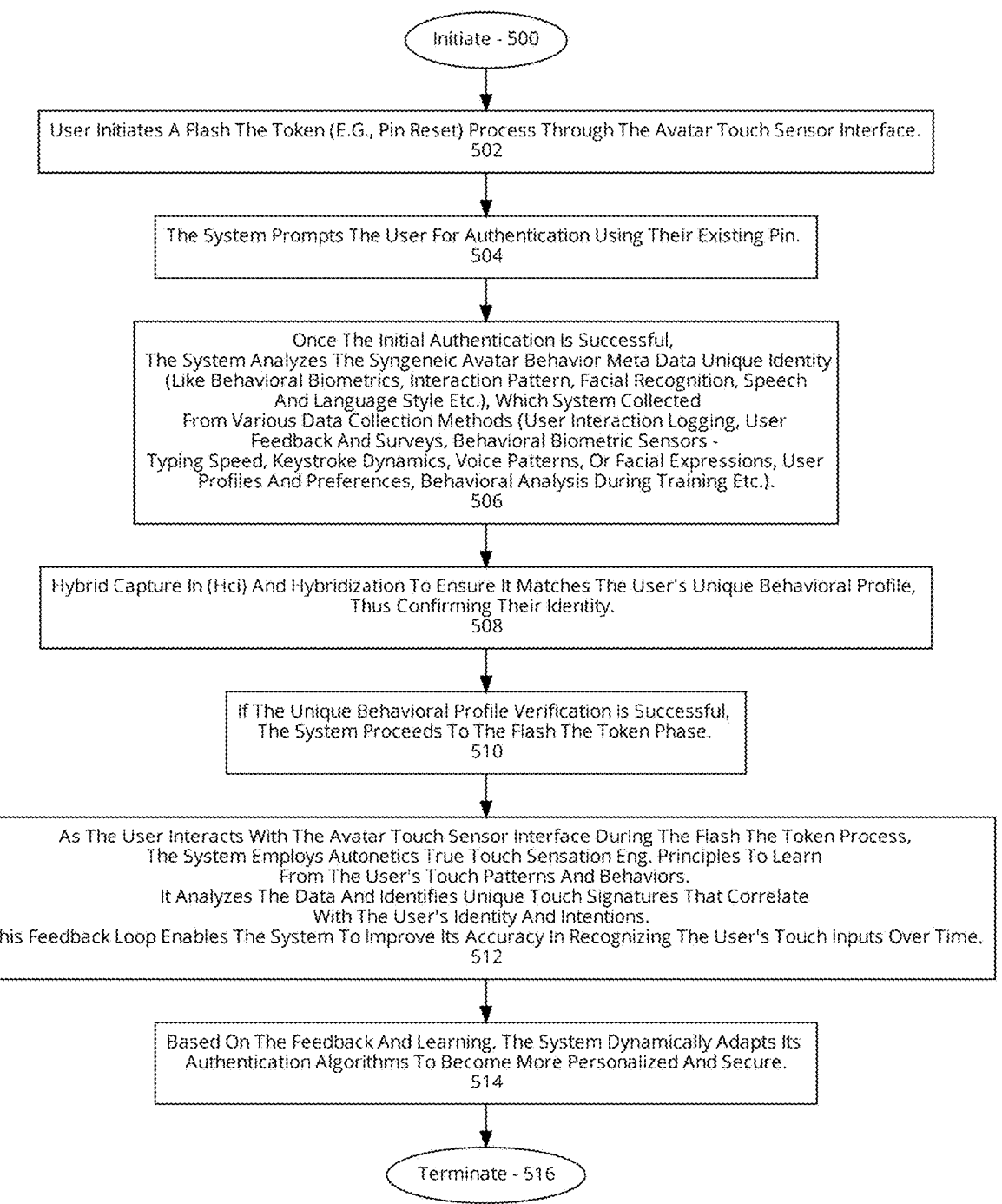

Initiate - 500

User Initiates A Flash The Token (E.G., Pin Reset) Process Through The Avatar Touch Sensor Interface.
502

The System Prompts The User For Authentication Using Their Existing Pin.
504

Once The Initial Authentication Is Successful,
The System Analyzes The Syngeneic Avatar Behavior Meta Data Unique Identity
(Like Behavioral Biometrics, Interaction Pattern, Facial Recognition, Speech
And Language Style Etc.), Which System Collected
From Various Data Collection Methods (User Interaction Logging, User
Feedback And Surveys, Behavioral Biometric Sensors -
Typing Speed, Keystroke Dynamics, Voice Patterns, Or Facial Expressions, User
Profiles And Preferences, Behavioral Analysis During Training Etc.).
506

Hybrid Capture In (Hci) And Hybridization To Ensure It Matches The User's Unique Behavioral Profile,
Thus Confirming Their Identity.
508

If The Unique Behavioral Profile Verification Is Successful,
The System Proceeds To The Flash The Token Phase.
510

As The User Interacts With The Avatar Touch Sensor Interface During The Flash The Token Process,
The System Employs Autonetics True Touch Sensation Eng. Principles To Learn
From The User's Touch Patterns And Behaviors.
It Analyzes The Data And Identifies Unique Touch Signatures That Correlate
With The User's Identity And Intentions.
This Feedback Loop Enables The System To Improve Its Accuracy In Recognizing The User's Touch Inputs Over Time.
512

Based On The Feedback And Learning, The System Dynamically Adapts Its
Authentication Algorithms To Become More Personalized And Secure.
514

Terminate - 516

FIG. 5

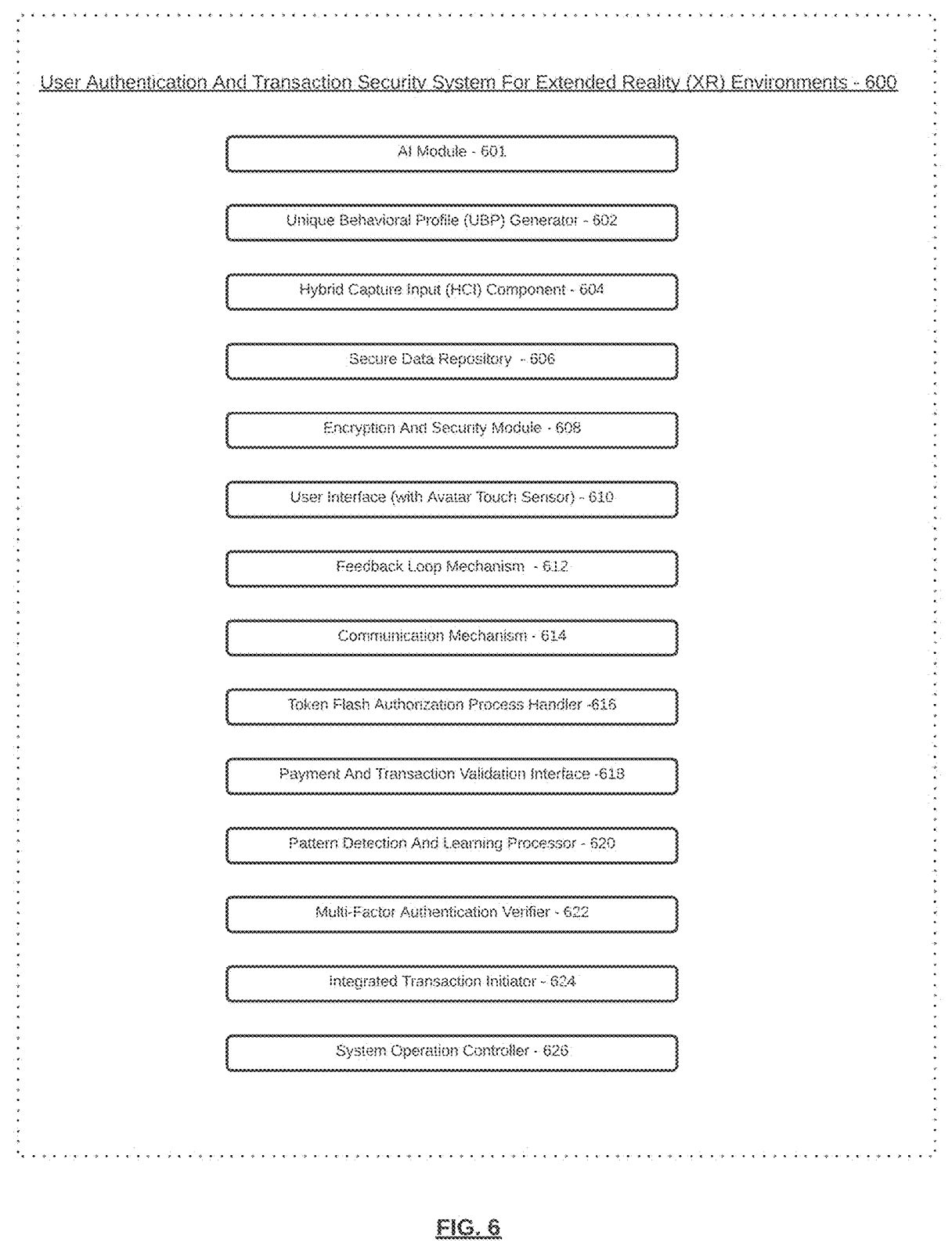

User Authentication And Transaction Security System For Extended Reality (XR) Environments - 600

AI Module - 601

Unique Behavioral Profile (UBP) Generator - 602

Hybrid Capture Input (HCI) Component - 604

Secure Data Repository - 606

Encryption And Security Module - 608

User Interface (with Avatar Touch Sensor) - 610

Feedback Loop Mechanism - 612

Communication Mechanism - 614

Token Flash Authorization Process Handler -616

Payment And Transaction Validation Interface -618

Pattern Detection And Learning Processor - 620

Multi-Factor Authentication Verifier - 622

Integrated Transaction Initiator - 624

System Operation Controller - 626

FIG. 6

FLASH TOKEN USING XR-AVATAR EXTRACTED SYNTHETIC AI METADATA

TECHNICAL FIELD

The present disclosure relates to the field of data processing—artificial intelligence based on authentication systems and more particularly to a system that dynamically authenticates users by employing artificial intelligence to extract and analyze behavioral and/or biometric data in Extended Reality (XR) environments.

DESCRIPTION OF THE RELATED ART

The problem addressed by this disclosure discusses the difficulties faced in balancing security and user-friendliness in the process of resetting the Personal Identification Number (PIN) for cards and flashing security tokens. The current authentication systems are primarily based on static credentials, such as digital PINs and biometric data, which present significant risks due to potential fraud, especially in remote settings. Various commercial sectors require a robust and secure process to authenticate transactions and user interactions, ensuring that sensitive information and financial assets are protected.

One of the challenges in secure and user-friendly card PIN reset and token flashing includes balancing security and ease of use in authentication. It is vital to verify the cardholder's identity when they request a token flash, to prevent unauthorized access. The challenge lies in implementing robust security measures like multi-factor authentication (including knowledge-based questions or biometric verification) without making the process too complicated for users. Regarding security concerns, the primary goal is to prevent unauthorized access during the token flashing or PIN reset process. This requires verifying the identity of the cardholder accurately. Regarding methods of authentication, to enhance security, institutions might use multi-factor authentication, combining something the user knows (like a password), something the user has (like a phone or token), and something the user is (like a fingerprint or facial recognition). For user-friendliness challenge, while these methods increase security, they can also make the process more complex and less intuitive, especially for users who are not tech-savvy.

Another challenge is support and instruction for customers. Some cardholders, especially those less familiar with technology or with limited digital access, might need help during the token flashing process. Offering effective support and clear guidance to a large customer base is challenging. Regarding diverse user base, users vary in their familiarity with digital tools. Some may find the process of resetting a PIN or flashing a token daunting. On the need for support, efficient customer service and clear instructions are crucial. However, providing personalized support to a large number of users can be resource intensive. With respect to an educational approach, institutions need to develop user-friendly guides and tutorials to help users understand the process, which can be a significant undertaking.

Another is ensuring a smooth customer experience. The goal is to keep the token flashing process straightforward and user-friendly without compromising security. Overly complex procedures can lead to customer frustration, errors, or abandonment. With respect to complexity vs. convenience, a complex security process can lead to customer dissatisfaction, potentially resulting in errors or users giving up on the process altogether. Regarding designing user-centric processes, institutions face the challenge of designing processes that are both secure and easy to follow, requiring a careful balance between thorough security measures and streamlined user experience.

A further is maintaining secure communications. It is crucial to protect sensitive data exchanged during the token flashing process. Implementing encryption and secure communication protocols across various platforms and devices poses significant challenges. Regarding protecting sensitive data, during the PIN reset or token flashing process, sensitive information is transmitted between the cardholder and the issuer. On challenges of diverse technologies, with a variety of platforms and devices used by customers, ensuring secure and encrypted communication across all these mediums is technically challenging. For evolving customer expectations, the trend towards digital banking has led to an expectation for remote services, including PIN resets. On security in remote operations, this remote functionality introduces new security risks, such as the potential for interception or fraud. Regarding implementing advanced security, institutions must develop and maintain advanced security measures, like end-to-end encryption and secure verification methods, to safeguard these remote processes.

Yet another is remote PIN Reset Security. With the increasing preference for online and mobile banking, customers expect to reset their PINs remotely. Ensuring the security of these remote processes, while reducing fraud risk, involves implementing stringent security protocols and encryption.

As digital interactions become more sophisticated and prevalent, the demand for an authentication system that can operate seamlessly in both the real and virtual worlds has become evident.

As an example, an XR-avatar is a digital representation or character used in extended reality (XR) environments. Extended Reality (XR) is an umbrella term that covers various forms of computer-altered reality, including Virtual Reality (VR), Augmented Reality (AR), and Mixed Reality (MR). In these environments, an XR-avatar represents a user. The main purpose of an XR-avatar is to provide a virtual identity that interacts in the three-dimensional, immersive environments of XR. Hence, as evident in this example, there is a long felt and unsatisfied need to provide a solution that can address the foregoing problems by repositioning flash tokens using XR-Avatar extracted synthetic artificial intelligence (AI) metadata.

SUMMARY OF THE INVENTION

In accordance with one or more arrangements of the non-limiting sample disclosures contained herein, solutions are provided to address one or more of the above issues and problems by, inter alia, utilizing an Autonetics true touch sensation engine and communication mechanism framework in order to enable AI identification and extraction of human/avatar behavior metadata that can be used to authenticate the user and user transactions.

An AI process can initiate a Flash the token (e.g., PIN reset) process through an avatar touch sensor interface or other XR interaction mechanism when a user attempts a financial transaction, at desired intervals, or after other events that would indicate that a token flash is warranted. The system can prompt the user for authentication using their existing PIN.

Once the initial authentication is successful, the system analyzes the syngeneic avatar behavior meta data unique identity (e.g., behavioral biometrics, interaction pattern, facial recognition, speech and language style, etc.), which the system has acquired and learned from using one or more various data collection methods (e.g., user interaction logging, user feedback and surveys, behavioral biometric sensors—typing speed, keystroke dynamics, voice patterns, or facial expressions, user profiles and preferences, behavioral analysis during training, etc.).

Utilizing Hybrid Capture Input (HCI) technology, the system and processes ensure that the user's behavior closely aligns with a pre-established Unique Behavioral Profile (UBP), thus confirming identity with high precision. Stated differently, HCI and hybridization can be used to ensure that the observed and extracted avatar interaction metadata matches the user's UBP for confirmation.

As the user interacts with the avatar touch sensor interface or other interaction mechanism during the flash the token process, the system employs Autonetics true touch sensation engine principles to learn from the user's touch patterns and behaviors. It analyzes the data and identifies unique touch signatures that correlate with the user's identity and intentions. This feedback loop enables the system to improve its accuracy in recognizing the user's touch inputs over time. Based on the feedback and learning, the system dynamically adapts its authentication algorithms to become more personalized and secure. By incorporating dynamic learning and feedback into the authentication process, the system can continually improve its accuracy and robustness.

As the user interacts with the avatar during the PIN reset process, the system and processes leverage Autonetics true touch sensation engineering to learn and recognize distinctive touch patterns and behaviors. This learning process is continuous, with the system and processes progressively improving the capability to discern and authenticate based on the user's unique touch signatures. The system and processes adapt its authentication algorithms dynamically, using the acquired data to refine and personalize the authentication process, enhancing both security and user experience.

The integration of syngeneic avatar behavior metadata with Autonetics true touch sensation engineering creates a novel authentication mechanism for PIN security systems.

The authentication method is unique, employing AI to mimic human/avatar behavior, thus providing a dual layer of security through the UBP and the physical touch interaction.

The system introduces Hybrid Capture Input (HCI) and hybridization, a control mechanism not seen before in card security systems, enhancing security through adaptive learning and self-regulation based on user behavior.

More specifically, the system and processes' adaptive AI authentication represents a significant leap from static security measures. It utilizes Autonetics principles to evolve the authentication model continuously, thereby increasing accuracy and robustness.

The real-time monitoring and assessment of user interaction offer an evolving authentication landscape. Instead of a static one-time authentication, this system ensures ongoing security by adapting to behavioral changes, making it extremely difficult for unauthorized entities to replicate or breach.

The incorporation of an avatar touch sensor as an interface is an inventive approach to user interaction, providing a multi-factor authentication method that combines traditional knowledge-based security with advanced behavioral analysis.

The disclosed authentication systems and processes represent a paradigm shift in security technology. The systems and processes disclosed herein blend advanced AI, sensory engineering, and user behavior analysis, to offer unprecedented levels of security in the authentication space. The system and processes' ability to learn and adapt to each user individually provide innovative secure authentication solutions.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, Autonetics refers to authentication of the user's identify. The authentication and authorization process can be based on the sense of touch, whereby two parties, a bank (or other) authorized/enabled platform and the Avatar, meet to communicate. This can be facilitated by a pop-up window on the platform, which provides the latitude and longitude in decimal format or the like (or can use X,Y,Z coordinates) using target navigation. By enabling the Autonetics true touch sensation engine, which incorporates cybernetic and haptic sensory technology, the system ensures a secure and reliable means of verifying the user's identity.

In some arrangements, Avatar enabled Autonetics true touch sensation technology, utilized in Human Avatar Touch and Sensation, allows for self-authentication of the user's identity whenever it is necessary in the system. This concept draws reference from the cybernetic hand for perception and action, as well as the induction of haptic sensation in the physical hand through a humanoid robot avatar.

In some arrangements, Avatar behavior metadata plays a crucial role in securely authorizing and interacting with human behavior. By studying the behavioral biometrics and interaction patterns of avatars, valuable insights are gained that enable a better understanding and interaction between humans and avatars. Through syngeneic behavior analysis and the like, systems and processes are able to recognize and mimic various aspects such as user body language/actions style, speech patterns, movements, typing speed, keystroke dynamics, decision-making processes, user profiles, preferences, and behavioral analysis during training. These metadata components are effectively utilized to enhance the authentication process, ensuring a strong and precise identification of the user.

In some arrangements, examples of syngeneic AI Mimic human/avatar behavior meta data can include user body language/actions style, speech patterns, movements, typing speed, keystroke dynamics etc. Avatar behavior metadata carries significant value as it allows systems and processes to better understand and interact with both human behavior and avatar behavior. By imitating human behavior and utilizing metadata references, the disclosures contained herein gain deeper insights and improve human/Avatar interactions and consequent authentications. This becomes particularly valuable when Syngeneic behavior can effectively recognize and adapt to user's speech, movements, and decision-making processes, resulting in more effective responses to user needs and smoother interactions overall.

In some arrangements, Hybrid Capture IN (HCI) is an innovative authentication system that combines expression, body part/biometric, wearable, and true touch sensation technologies. For the systems and processes disclosed herein, the following HCI can be enabled and utilized: an expression base authorization; body part/biometric base authorization; wearable base authorization, etc. HCI authentication process combines expression-based, body part/biometric-based, wearable-based, and true touch sensation-based authentication methods. Users express specific facial expressions or gestures while their unique body features are scanned and captured. They may also wear specialized wearable devices to enhance authentication. HCI ensures secure and accurate authentication, reducing the risk of unauthorized access and protecting sensitive information.

In some arrangements, an authentication process with hybridization provides multi-level authentication for resetting a flash-based token like Avatar touch/tap to pay, Avatar touch/tap to acknowledge, and enabling authorized flow in a collaboration and application event process by the Avatar self-owner using true touch authentication. The authentication process for Avatar-based transactions and collaborative applications involves the avatar self-owner physically tapping their flash-based token on a designated area. The token's true touch technology analyzes unique touch characteristics to verify the self-owner's authenticity and prevent unauthorized access. Once authenticated, the self-owner can securely proceed with actions like making payments or acknowledging event participation. This multi-level authentication, combining hybridization and true touch, ensures a secure user experience by integrating the physical representation of the self-owner, touch-based identity verification, and secure data communication.

In some arrangements, synergetic avatar behavior metadata unique identity are identified by using cybernetic Autonetic true touch sensation technology, which is utilized for token reset process.

In some arrangements, a user authentication and transaction security system for Extended Reality (XR) environments, can comprise one or more of:

a. a unique behavioral profile (UBP) generator within an AI module for creating a UBP for the user based on analyzed metadata, which includes data from a plurality of biometric sensors for facial recognition, speech pattern analysis, and gesture tracking;

b. a hybrid capture input (HCI) component for real-time comparison of current user interactions against the UBP to verify user identity and for adjusting authentication algorithms based on detected deviations from the UBP;

c. a secure data repository for storing transaction and authentication records, categorized by transaction type, user identity, and outcome of an authentication process;

d. an encryption and security module to secure user data, both in-transit and at-rest;

e. a user interface featuring an avatar touch sensor for interactive data collection and for delivering authentication prompts, including PIN input, to the user;

f. a feedback loop mechanism integrated within the AI module for refining and personalizing the authentication algorithms by learning from user ongoing touch patterns and behaviors, and providing real-time haptic feedback to the user;

g. a communication mechanism to facilitate interaction between a user avatar and the AI module, including a graphical user interface within the XR environment for said user authentication;

h. a token flash authorization process handler that manages generation and validation of security tokens, including invalidating previous tokens and generating new tokens for subsequent authentications;

i. a payment and transaction validation interface that interfaces with a payment gateway or cryptocurrency network to validate and process transactions post-authentication;

j. a pattern detection and learning processor within the AI module that processes metadata to detect patterns indicative of fraudulent behavior and incorporates new user interaction data into the UBP after each authentication event;

k. a multi-factor authentication verifier utilizing the HCI component to combine analyzed touch interaction data with at least one other authentication factor for enhanced security;

l. an integrated transaction initiator within the XR environment operative to trigger the token flash authorization process in response to a financial transaction initiated by the user; and/or m. a system operation controller configured to manage the AI module's continuous learning process, ensuring dynamic adaptation of the authentication algorithms based on a feedback loop that assesses the accuracy and robustness of user touch inputs over time, and to maintain the overall functionality of the system components within the XR environment.

In some arrangements, a system for dynamic authentication in Extended Reality (XR) environments can include one or more of:

a. an Autonetics true touch sensation engine capable of authenticating a user's identity through analysis of touch and sensation data obtained during user-avatar interaction within the XR environment;

b. an artificial intelligence (AI) module configured to process behavioral and biometric data to extract syngeneic avatar behavior metadata and to dynamically initiate a token flashing process based on predefined security events;

c. an Hybrid Capture Input (HCI) technology component that aligns and verifies user interaction patterns with a pre-established Unique Behavioral Profile (UBP) for identity confirmation;

d. a data repository that stores and manages the extracted metadata, user information, authentication records, and transaction details;

e. an encryption and security module responsible for the encryption of sensitive data and the maintenance of privacy and security within the XR environment;

f. a user interface, including an avatar touch sensor, which facilitates the collection of behavioral data and the delivery of authentication prompts to the user;

g. a feedback loop mechanism within the AI module that refines and personalizes the system's authentication algorithms by learning from the user's touch patterns and behaviors over time; and/or h. a token flash authorization process handler that manages the generation and validation of security tokens within the XR environment.

In some arrangements, the AI module utilizes machine learning techniques to adaptively enhance the precision of the UBP based on continuous user interaction data.

In some arrangements, the AI module is further configured to initiate the token flashing process when a financial transaction is attempted by the user within the XR environment.

In some arrangements, the HCI technology component employs a combination of expression-based, body part/biometric-based, wearable-based, and true touch sensation-based authentication methods.

In some arrangements, the AI module analyzes the syngeneic avatar behavior metadata based on data collection methods including at least one of user interaction logging, user feedback and surveys, behavioral biometric sensors, user profiles, and behavioral analysis during training.

In some arrangements, the data repository includes a synthetic AI metadata store for the specific purpose of managing metadata information related to authentication processes.

In some arrangements, the feedback loop mechanism is further configured to dynamically adapt authentication algorithms based on the unique touch signatures identified during user interactions with the avatar touch sensor interface.

In some arrangements, the encryption and security module handles data encryption using at least one of symmetric or asymmetric encryption methodologies to ensure the security and privacy of the user's sensitive information.

In some arrangements, a method for authenticating users within Extended Reality (XR) environments, comprising one or more steps such as, for example:

a. initializing an Autonetics true touch sensation engine within the XR environment to capture tactile user interactions with an avatar interface;

b. activating an artificial intelligence (AI) module to extract and analyze syngeneic avatar behavior metadata based on the tactile user interactions;

c. generating a unique behavioral profile (UBP) for the user by processing the extracted metadata through the AI module;

d. comparing, in real-time, current user interactions with the pre-established UBP via Hybrid Capture Input (HCI) technology to verify user identity;

e. conducting a secure token flashing process when user authentication is required, facilitated by the AI module;

f. storing transaction and authentication records in a secure data repository;

g. encrypting sensitive user data using an encryption and security module to ensure data privacy within the XR environment;

h. adapting authentication algorithms dynamically within the AI module based on a feedback loop that assesses the user's ongoing touch patterns and behaviors;

i. prompting the user for authentication via a graphical user interface within the XR environment, which requires input of a personal identification number (PIN) before initiating the secure token flashing process;

j. providing real-time feedback to the user during the authentication process via haptic feedback mechanisms embedded within the XR environment;

k. interfacing with a payment gateway or cryptocurrency network to validate the transaction post-authentication; and/or l. utilizing the HCI technology to perform multi-factor authentication by combining the analyzed touch interaction data with at least one other authentication factor.

In some arrangements, the extracting step further involves collecting data from a plurality of biometric sensors integrated within the XR environment, including at least one of facial recognition, speech pattern analysis, and gesture tracking sensors.

In some arrangements, the HCI technology includes analyzing the force, duration, and pattern of the user's touch interactions with the avatar interface.

In some arrangements, the step of conducting a secure token flashing process includes the sub-step of invalidating a previous security token and generating a new token, which is then communicated to the user for subsequent authentication events.

In some arrangements, the step of storing transaction and authentication records in a secure data repository includes categorizing the records based on transaction type, user identity, and outcome of the authentication process.

In some arrangements, the step of dynamically adapting authentication algorithms is based on a continuous learning process that incorporates new user interaction data into the UBP after each authentication event.

In some arrangements, the step of activating the AI module to extract and analyze metadata further includes processing the metadata to detect and learn from patterns indicative of fraudulent behavior.

In some arrangements, a robotic system for token security validates both the correct behavior data as well as correct physical touch input. Thus, this is validating the user behavior, unique identification by unique behavior identification as well as unique touch, unique physical touch input.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

FIG. 2A depicts an exemplary XR environment and user/avatar interaction showing sample interactions, interfaces, steps, functions, and components in accordance with one or more aspects of this disclosure as they relate to flashing tokens using AR-avatar extracted synthetic AI metadata for a proposed transaction.

FIG. 5 depicts another exemplary flow diagram showing sample interactions, interfaces, steps, functions, and components in accordance with one or more aspects of this disclosure as they relate to flashing tokens using XR-avatar extracted synthetic AI metadata for a proposed transaction.

FIG. 6. depicts a sample user authentication and transaction security system for extended reality (XR) environments.

DETAILED DESCRIPTION

Figure 1:
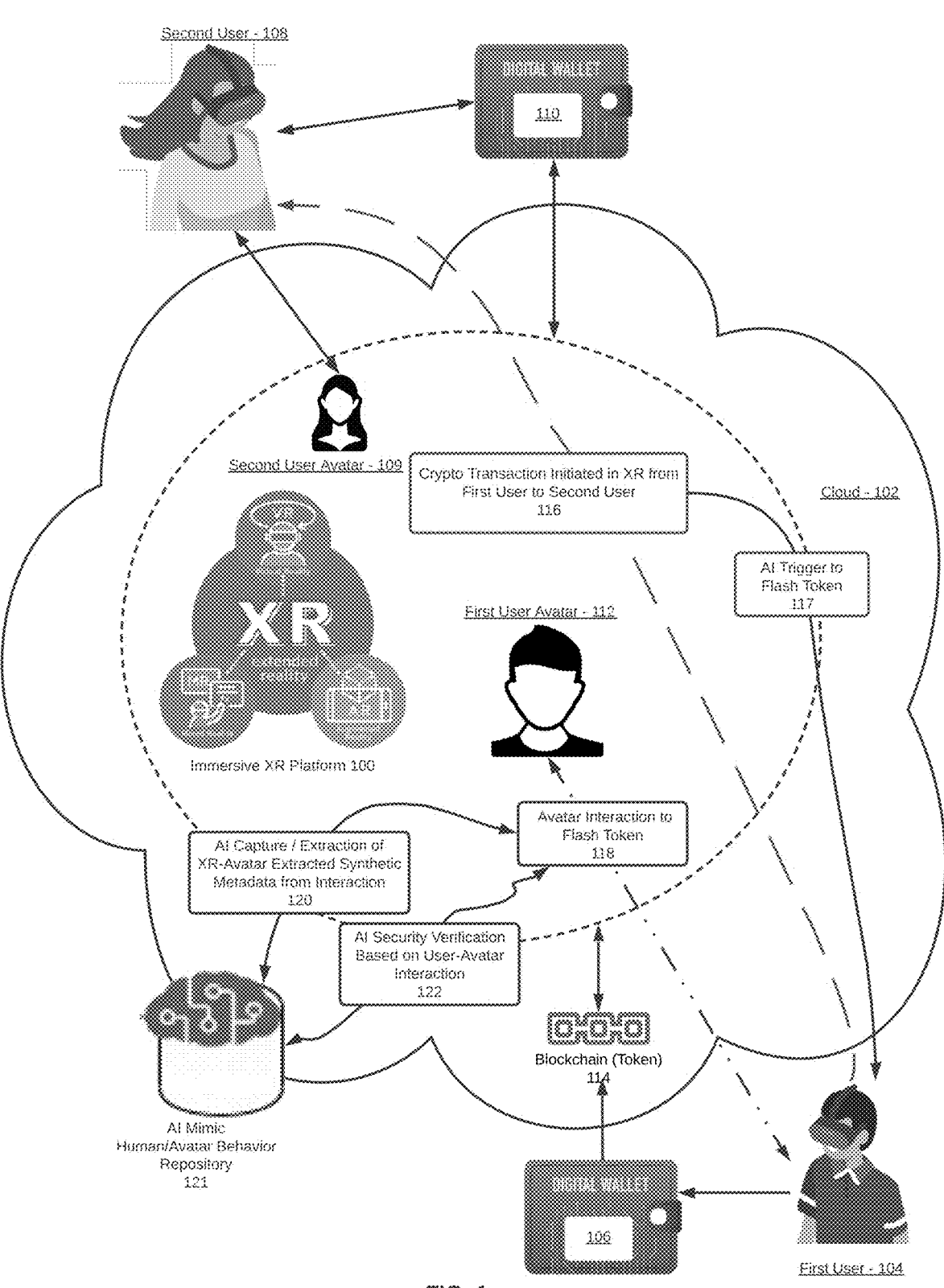
FIG. 1 depicts an exemplary architectural diagram showing sample interactions, interfaces, steps, functions, and components in accordance with one or more aspects of this disclosure as they relate to flashing tokens using XR-avatar extracted synthetic AI metadata for a proposed transaction.

In the following description of the various embodiments to accomplish the foregoing, reference is made to the drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like (referenced interchangeably herein depending on context) can include one or more general-purpose, customized, configured, special-purpose, virtual, physical, and/or network-accessible devices as well as all hardware/software/components contained therein or used therewith as would be understood by a skilled artisan, and may have one or more application specific integrated circuits (ASICs), microprocessors, cores, executors etc. for executing, accessing, controlling, implementing etc. various software, computer-executable instructions, data, modules, processes, routines, or the like as explained below. References herein are not considered limiting or exclusive to any type(s) of electrical device(s), or component(s), or the like, and are to be interpreted broadly as understood by persons of skill in the art. Various specific or general computer/network/software components, machines, or the like are not depicted in the interest of brevity or discussed herein in detail because they are known and understood by ordinary artisans.

Software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data/blockchains/distributed ledger blockchains etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting disclosure, FIG. 1 depicts an exemplary architectural diagram showing sample interactions, interfaces, steps, functions, and components in accordance with one or more aspects of this disclosure as they relate to flashing tokens using XR-avatar extracted synthetic AI metadata for a proposed transaction.

The architectural diagram illustrates a technical solution for a secure authentication and payment authorization system. The key components and their interactions are as follows:

a. Autonetics True Touch Sensation Engine: This is the core component that authenticates the user's identity. It operates on the principles of touch and sensation to verify that the user is who they claim to be.

b. Syngeneic AI Mimic Human/Avatar Behavior Metadata Technology: Integrated into the system, this technology enhances security by using behavior metadata which includes patterns and biometrics that are unique to each user. This component is crucial for the verification process, providing an additional layer of security to the authentication process.

c. Process Handling for Token Flash Authorization: The system includes a process that manages the authorization to flash the token once it's generated. This step is essential before any transaction can proceed.

d. Payment Authorization Process Post Token Flash: Following the generation and flashing of the token, the user moves forward with the payment authorization. The syngeneic AI mimic behavior metadata plays a significant role in securely authorizing the payment. It checks the authenticity of the behavior against stored profiles.

e. Transmission of Payment Details: Upon successful authorization, the payment details are securely transmitted to either a payment gateway or a cryptocurrency network for processing. This ensures that the transaction is not only secure but also authenticated.

As illustrated in FIG. 1, the Synthetic AI Metadata Store is a repository that manages all the metadata information related to the authentication processes. It serves as a central hub for storing and accessing the metadata required for verifying user identities.

The Synthetic AI Metadata Integration Component acts as a bridge between the metadata store and the authentication processes. It enables the seamless use of stored metadata to authenticate users.

The Database maintains a record of essential data such as user information, Non-Fungible Token (NFT) assignments, authentication records, and detailed transaction logs. This component maintains an accurate and secure record of all transactions and authentication events.

An Encryption and Security module is dedicated to ensuring the integrity and confidentiality of data. It encrypts sensitive information, safeguarding it from unauthorized access or breaches, thereby maintaining the overall security and privacy of the system.

The architecture described offers a robust framework for authenticating user identity and processing transactions with an added layer of security provided by the unique integration of behavior metadata technology and the innovative use of true touch sensation engineering. The system's focus on data encryption and secure handling of sensitive information emphasizes its commitment to maintaining user privacy and security in the digital transaction space.

In FIG. 1, a first user 104 is attempting to enter into a financial transaction with a second user 108 via an immersive XR platform 100, which may include virtual reality, mixed reality, augmented reality, or the like. This may be, for example, the first user sending the second user a digital payment or performing a cryptocurrency transfer. This would involve a transfer from the first user digital wallet 106 to the second user digital wallet 110.

If desired, these digital wallets 106, 110 can be cold storage digital wallets, also known as cold wallets, which refer to a way of keeping a user's cryptocurrencies or digital assets offline. This method of storage is used to prevent unauthorized access, cyber hacks, and other vulnerabilities that an internet-connected wallet, or "hot wallet," may be susceptible to.

There are several forms of cold storage wallets such as, for example, (a) Hardware Wallets: Physical devices that store cryptocurrencies offline. They often look like USB drives and can be connected to a computer when you want to transfer assets. (b) Paper Wallets: Physical documents that contain a public address for receiving cryptocurrencies and a private key, which allows you to spend or transfer cryptocurrencies stored at that address. They are printed in the form of QR codes so that you can quickly scan them and add the keys to a software wallet to make a transaction. (c) Sound Wallets: Less common, these use sound (like a CD or a vinyl record) to store the data as audio files. (d) Steel Wallets: A piece of metal with your private key information stamped or etched onto it, providing durability against physical damage like fire or water.

Tokens (that must be flashed for security purposes) are not physically stored on the digital hardware wallet in the way that files are stored on a USB drive. Instead, a hardware wallet stores the private keys that you use to sign transactions for blockchain-based assets, such as cryptocurrencies and tokens, securely offline. The private keys prove the user's ownership of cryptocurrency or tokens. They are used to sign transactions that send your cryptocurrency to another address. Public addresses are the addresses where the user's cryptocurrencies and tokens are sent. They are account numbers and can be shared publicly. The actual tokens and cryptocurrencies are stored on the blockchain 114, which is a decentralized ledger that records all transactions across a network of computers in the cloud 102.

So, in essence, a hardware wallet is a secure keychain for your digital assets rather than a storage device for the assets themselves. It's an essential distinction because it highlights the decentralized nature of cryptocurrencies—the user's assets are not "inside" the wallet; they are on the blockchain, and the user's wallet just holds the keys to access and manage them. And the token stored on the blockchain is used for authentication and security purposes.

In this example, the first user may attempt to initiate a cryptocurrency transaction in XR to send cryptocurrency from the first user to the second user in 116. The may trigger an AI process to flash the token for security purposes in 117.

In the context of digital security and authentication, "flash the token" generally refers to a process where a security token or an authentication token is reset or updated. This can be part of a multi-factor authentication (MFA) system where tokens are used to verify a user's identity. Here are a few specific contexts where "flash the token" might be used: (a) One-Time Passwords (OTPs): If the token is an OTP, "flashing the token" could mean generating a new OTP that the user must provide during the authentication process. (b) Hardware Tokens: For hardware tokens, such as those used in banking or by IT departments, "flashing the token" might involve updating the firmware or the internal software that generates the authentication codes. (c) Software Tokens: In software-based tokens or applications, it may mean updating or refreshing the token within the app, perhaps by re-authenticating or syncing the app with a secure server to ensure it is still valid. (d) Token Revocation and Reissue: If a security token is suspected to be compromised, the token might be "flashed" by revoking the old token and issuing a new one to maintain security. (e) Smart Cards: For smart cards used as security tokens, "flashing" could involve reprogramming or updating the data stored on the card. In this particular example, it can be a process initiated by an AI through an avatar touch sensor interface or other interaction mechanism 118, likely as a security measure to reset or revalidate a user's authentication token, in response to an AI determination that the security measure is necessary for the proposed transaction 116.

It is part of a more extensive system that uses unique behavioral data (such as typing patterns, touch interactions, etc.) to authenticate a user before allowing a financial transaction to proceed. Hence there is an AI capture/extraction of XR-avatar extracted synthetic metadata based on what the AI process observes between the interaction of the first user 104 with the first user's avatar 112. Initial captures and extraction 120 can be used to "learn" from the user's behavior and interaction, and then can be used to train models for AI mimic human/avatar behavior, which can be stored in repository 121. Thereafter AI security verification can be performed when necessary to flash the token using this metadata and these trained models based on user-avatar interaction 122. After verification is complete, the transaction may be processed.

Thus, Autonetics was used to authenticate the user's identity and the process was based on the sense of touch, whereby two parties, the Bank authorized enable platform and the avatars, meet to communicate. This is facilitated by a pop-up window on the platform (as discussed in more detail in FIGS. 2A-2B), which provides the latitude and longitude in decimal format using target navigation and/or X, Y, Z coordinates. By enabling the Autonetics true touch sensation Eng, which incorporates cybernetic and haptic sensory technology, the system ensures a secure and reliable means of verifying the user's identity.

The concept of avatar-enabled Autonetics true touch sensation technology, inspired by the technique utilized in Human Avatar Touch and Sensation, allows for self-authentication of the user's identity whenever it is necessary in the system. This concept draws reference from the cybernetic hand for perception and action, as well as the induction of haptic sensation in the physical hand through a humanoid robot avatar.

Figure 2B:
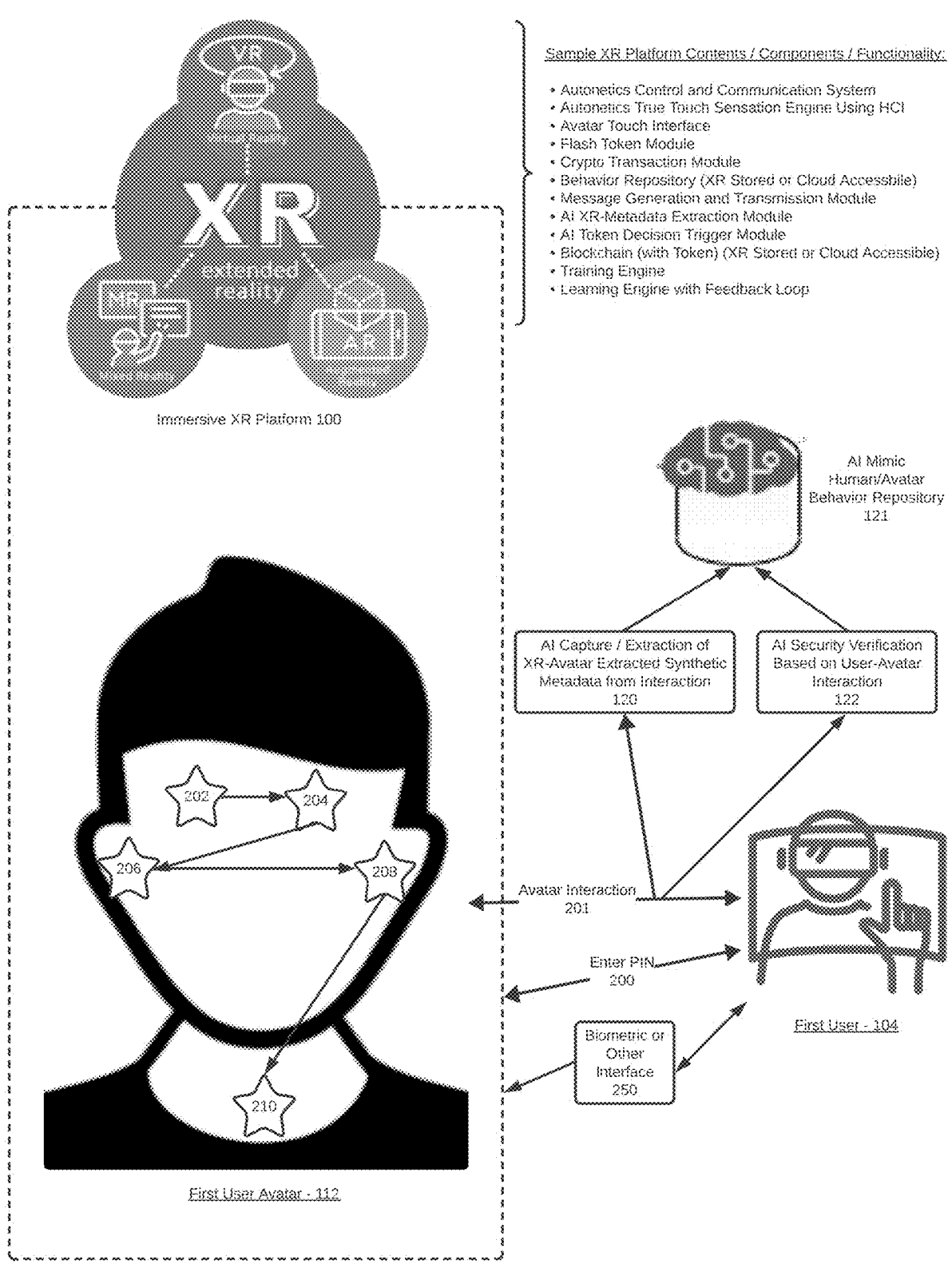
FIG. 2B depicts an example XR environment and specific sample user/avatar interaction showing interactions, interfaces, steps, functions, and components in accordance with one or more aspects of this disclosure as they relate to flashing tokens using AR-avatar extracted synthetic AI metadata for a proposed transaction.

By way of non-limiting disclosure, FIGS. 2A-2B depict exemplary XR environment(s) and user/avatar interaction(s) showing sample interactions, interfaces, steps, functions, and components in accordance with one or more aspects of this disclosure as they relate to flashing tokens using AR-avatar extracted synthetic AI metadata for a proposed transaction.

Immersive XR Platform 100 may include or work in conjunction with cloud-based implementations of content, components, and functionality. This may include, for example, one or more of Autonetics control and communication system, Autonetics true touch sensation engine using HCI, avatar touch interface, a flash token module, crypto transaction module, behavior repository, message generation and transmission module, AI XR-metadata extraction module, AI token decision trigger module, blockchain (with token) (XR stored or cloud accessible), a training engine/AI learning model, and a learning engine with feedback loop.

As first user 104 interacts 201 with the first user avatar 112, an AI collection engine 252 can utilize various data collection methods. These methods may include, for example, one or more of user interaction logging, user feedback and surveys, behavioral biometric sensors—typing speed, keystroke dynamics, voice patterns, or facial expressions, user profiles and preferences, behavioral analysis during training, etc.

The data collected 254 may include syngeneic avatar behavior metadata unique identity information (e.g., behavioral biometrics, interaction pattern, facial recognition, speech and language style, etc.).

As noted previously, Hybrid Capture IN (HCI) and hybridization Engine 256 ensure a match to the user's unique behavioral profile, thus confirming their identity.

The example of FIG. 2B illustrates a sample data collection method where an interaction logging is used to verify the user's identify. The first user 104 initiates the transaction and then enters their PIN for the account. A biometric or other interface 250 is used by the first user 104 to interact with the first user's avatar 112. For identify verification purposes, the may have selected an option where the user touches various locations on the avatar in a particular order such as eyes 202 and 204, then ears 206 and 208, and lastly 210. The particular points coordinate points or locations touched, the order in which they are selected, etc. can be the avatar behavior metadata that can uniquely identify the user in combination with other security information such as the user's PIN.

Figure 3:
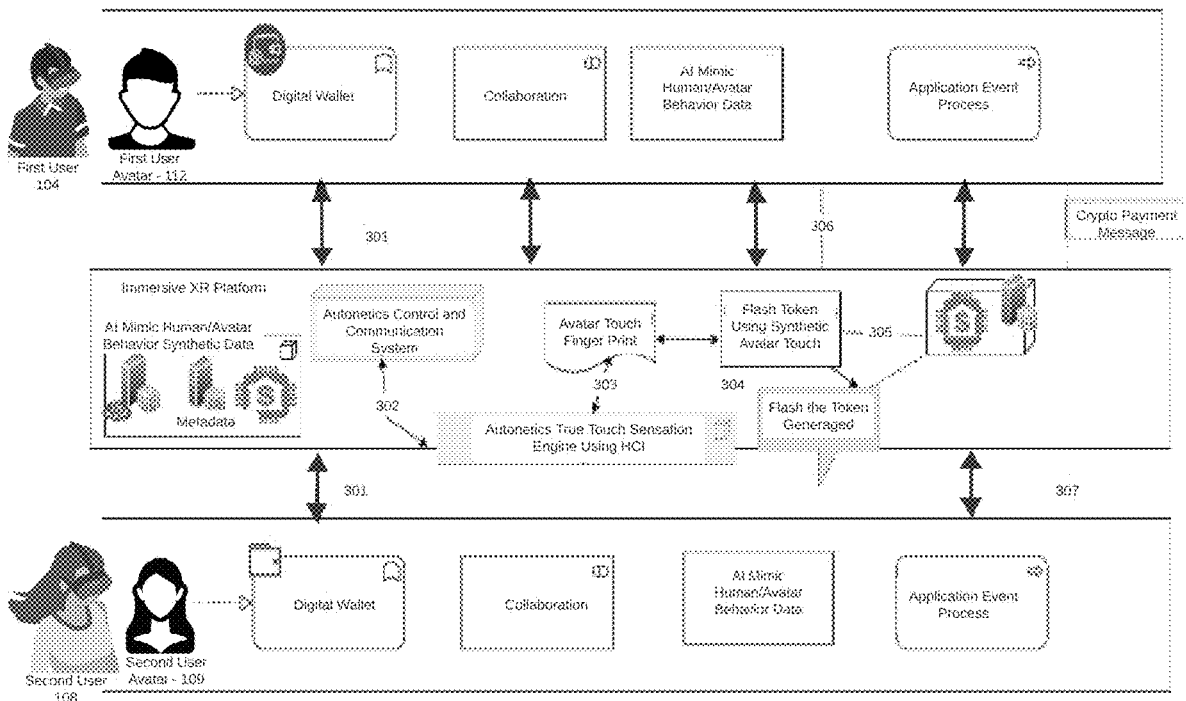
FIG. 3 depicts a unified modeling language (UML) diagram showing interactions, interfaces, steps, functions, and components in accordance with one or more aspects of this disclosure as they relate to flashing tokens using AR-avatar extracted synthetic AI metadata for a proposed transaction.

By way of non-limiting disclosure, FIG. 3 depicts a unified modeling language (UML) diagram showing interactions, interfaces, steps, functions, and components in accordance with one or more aspects of this disclosure as they relate to flashing tokens using AR-avatar extracted synthetic AI metadata for a proposed transaction.

This UML example is again for a proposed 2-party financial transaction. The system verifies the user's identity through a touch-based authentication and authorization procedure. In this setup, interaction occurs in 301 between two entities: the bank's authorized platform and the user's avatar. Communication is established through a dialog box that appears on the platform, detailing geographic coordinates in decimal form to guide the process. Leveraging the Autonetics true touch sensation engine, which integrates cybernetic principles and haptic feedback technologies, the system provides a dependable and secure method for identity confirmation.

This accomplished with the Autonetics control and communication system in 302 controlling the Autonetics true touch sensation engine using HCI which receives an Avatar touch fingerprint or other behavioral metadata as an input in 303. The token is flashed using the synthetic avatar touch or other in 304, after which it is stored in 305 and success message that the token was flashed can be generated. Feedback can be provided to the first user in 306 and notice can be provided to the second user in 307. The final result could be a message indicated that the crypto payment was sent successfully.

Figure 4:
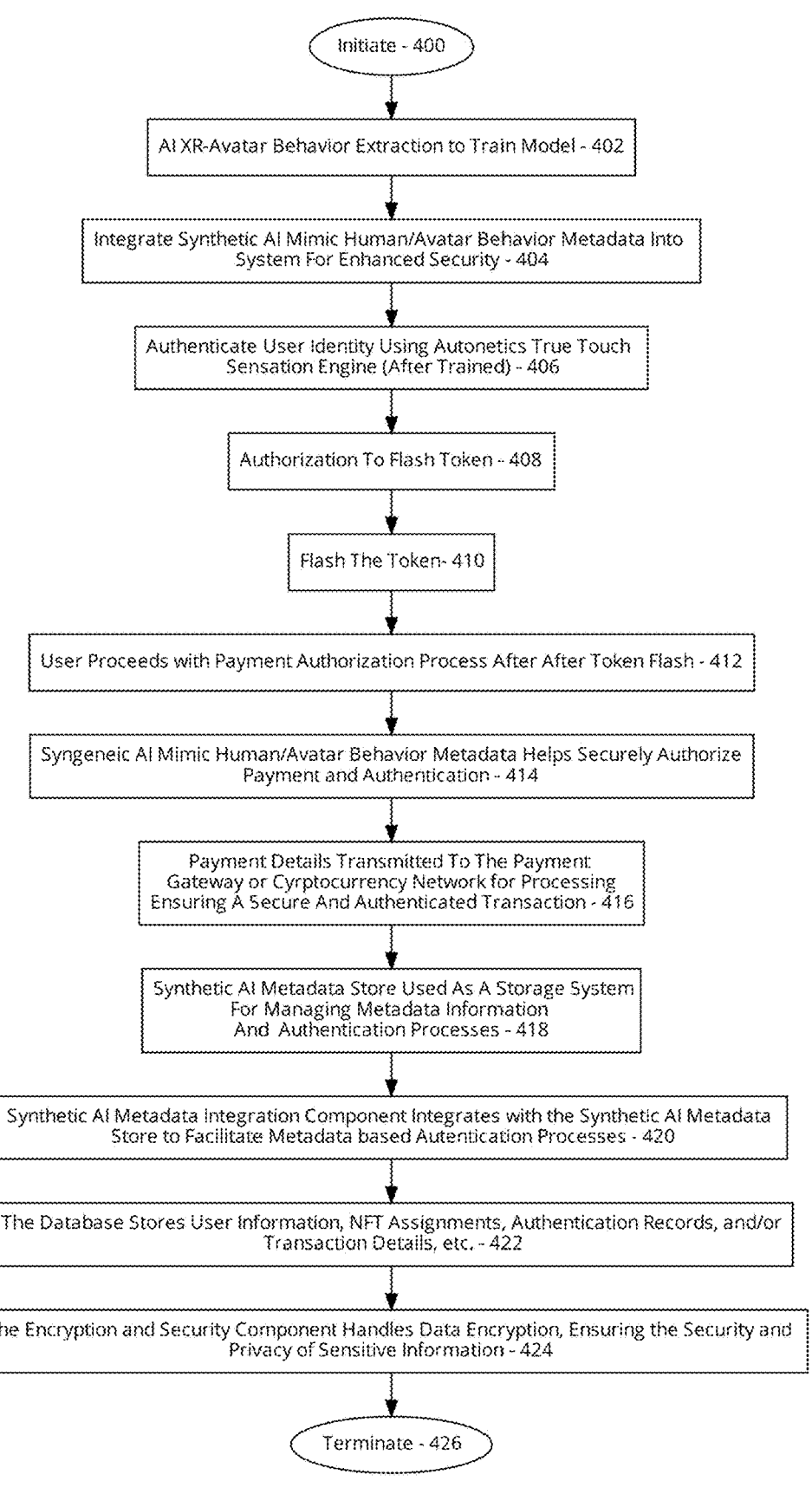
FIG. 4 depicts an exemplary flow diagram showing sample interactions, interfaces, steps, functions, and components in accordance with one or more aspects of this disclosure as they relate to flashing tokens using XR-avatar extracted synthetic AI metadata for a proposed transaction.

By way of non-limiting disclosure, FIG. 4 depicts an exemplary flow diagram showing sample interactions, interfaces, steps, functions, and components in accordance with one or more aspects of this disclosure as they relate to flashing tokens using XR-avatar extracted synthetic AI metadata for a proposed transaction.

The process is initiated in 400. In 402, AI monitors and extracts XR-avatar behavior metadata to train a model and system regarding user and user avatar interactions.

The synthetic AI mimic human/avatar behavior metadata is integrated into the system to provide enhanced security to flash the token in 404.

After PIN initial preliminary verification, the user identity can be authenticated in 406 by using the Autonetics true touch sensation engine (after trained based on prior avatar/user interactions.)

If the observed interactions between the user and the avatar match the stored behavior metadata, authorization can be granted to flash the token in 408 and the token is then flashed in 410.

In this particular example, the user can then proceed with the payment authorization process after the token was flashed in 412.

The syngeneic AI mimic human/avatar behavior metadata is utilized to securely authorize payment and authentication in 414.

Payment details are transmitted to the payment gateway or cryptocurrency network for processing ensuring a secure and authenticated transaction in 416.

A synthetic AI metadata store is used as a storage system for managing metadata information and for authentication processes in 418.

A synthetic AI metadata integration component integrates with the synthetic AI metadata store to facilitate metadata based authentication processes in 420.

The database can store user information, NFT assignments, authentication records, and/or transaction details, etc. in 422.

The encryption and security component can handle data encryption, ensuring the security and privacy of sensitive information in 424.

The process may continue as needed or wait until triggered again, or otherwise terminate in 426.

By way of non-limiting disclosure, FIG. 5 depicts another exemplary flow diagram showing sample interactions, interfaces, steps, functions, and components in accordance with one or more aspects of this disclosure as they relate to flashing tokens using XR-avatar extracted synthetic AI metadata for a proposed transaction.

The process can commence in 500. On the user's own request or in response to an AI trigger, such as a need update security credentials due to a time period or for a particular type of transaction or if a transaction is potentially suspicious, a user could be required to initiate a flash the token (e.g., pin reset) process through the avatar touch sensor interface in 502.

The system could initially prompt the user for preliminary authentication using their existing pin in 504. Once the initial authentication is successful, the system analyzes the syngeneic avatar behavior metadata unique identity (like behavioral biometrics, interaction pattern, facial recognition, speech and language style etc.), which system collected from various data collection methods (user interaction logging, user feedback and surveys, behavioral biometric sensors—typing speed, keystroke dynamics, voice patterns, or facial expressions, user profiles and preferences, behavioral analysis during training etc.) in 506.

HCI and hybridization can then be utilized to ensure it matches the user's unique behavioral profile, thus confirming their identity in 508.

If the unique behavioral profile verification is successful, the system proceeds to the flash the token phase in 510.

In 512, as the user interacts with the avatar touch sensor interface during the flash the token process, the system employs Autonetics true touch sensation engineering principles to learn from the user's touch patterns and behaviors. It analyzes the data and identifies unique touch signatures that correlate with the user's identity and intentions. This feedback loop enables the system to improve its accuracy in recognizing the user's touch inputs over time.

In 514, based on the feedback and learning, the system dynamically adapts its authentication algorithms to become more personalized and secure. Thereafter the process may terminate until triggered again or until there is another interaction between a user and the user avatar.

By way of non-limiting disclosure, FIG. 6. depicts a sample user authentication and transaction security system 600 for extended reality (XR) environments. In this sample system, one or more components can be included and work together such as a unique behavioral profile (UBP) generator 602 can be contained within an AI module 601 for creating a UBP for the user based on analyzed metadata, which includes data from a plurality of biometric sensors for facial recognition, speech pattern analysis, and gesture tracking.

A hybrid capture input (HCI) component 604 can provide for real-time comparison of current user interactions against the UBP to verify user identity and for adjusting authentication algorithms based on detected deviations from the UBP. A secure data repository 606 can store transaction and authentication records, categorized by transaction type, user identity, and outcome of an authentication process. An encryption and security module 608 can secure user data, both in-transit and at-rest.

A user interface 610 can utilize an avatar touch sensor for interactive data collection and for delivering authentication prompts, including PIN input, to the user. A feedback loop mechanism 612 can be integrated within the AI module for refining and personalizing the authentication algorithms by learning from user ongoing touch patterns and behaviors, and provide real-time haptic feedback to the user. A communication mechanism 614 can facilitate interaction between a user avatar and the AI module, including a graphical user interface within the XR environment for said user authentication.

A token flash authorization process handler 616 can manage generation and validation of security tokens, including invalidating previous tokens and generating new tokens for subsequent authentications. A payment and transaction validation interface 618 can work in conjunction with a payment gateway or cryptocurrency network to validate and process transactions post-authentication.

A pattern detection and learning processor 620 within the AI module can process metadata to detect patterns indicative of fraudulent behavior and incorporates new user interaction data into the UBP after each authentication event. A multi-factor authentication verifier 622 can utilize the HCI component to combine analyzed touch interaction data with at least one other authentication factor for enhanced security.

An integrated transaction initiator 624 within the XR environment can be operative to trigger the token flash authorization process in response to a financial transaction initiated by the user. A system operation controller can be configured to manage the AI module's continuous learning process, ensuring dynamic adaptation of the authentication algorithms based on a feedback loop that assesses the accuracy and robustness of user touch inputs overtime, and to maintain the overall functionality of the system components within the XR environment.

In another sample system, portions of which may not be expressly depicted but are inherently shown and included, a system for dynamic authentication in Extended Reality (XR) environments can include one or more of: a. an Autonetics true touch sensation engine capable of authenticating a user's identity through analysis of touch and sensation data obtained during user-avatar interaction within the XR environment; b. an artificial intelligence (AI) module configured to process behavioral and biometric data to extract syngeneic avatar behavior metadata and to dynamically initiate a token flashing process based on predefined security events; c. an Hybrid Capture Input (HCI) technology component that aligns and verifies user interaction patterns with a pre-established Unique Behavioral Profile (UBP) for identity confirmation; d. a data repository that stores and manages the extracted metadata, user information, authentication records, and transaction details; e. an encryption and security module responsible for the encryption of sensitive data and the maintenance of privacy and security within the XR environment; f. a user interface, including an avatar touch sensor, which facilitates the collection of behavioral data and the delivery of authentication prompts to the user; g. a feedback loop mechanism within the AI module that refines and personalizes the system's authentication algorithms by learning from the user's touch patterns and behaviors overtime; and/or h. a token flash authorization process handler that manages the generation and validation of security tokens within the XR environment.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A user authentication and transaction security system for Extended Reality (XR) environments, comprising:
  a unique behavioral profile (UBP) generator within an AI module for creating a UBP for the user based on analyzed metadata, which includes data from a plurality of biometric sensors for facial recognition, speech pattern analysis, and gesture tracking;

a hybrid capture input (HCI) component for real-time comparison of current user interactions against the UBP to verify user identity and for adjusting authentication algorithms based on detected deviations from the UBP;

a secure data repository for storing transaction and authentication records, categorized by transaction type, user identity, and outcome of an authentication process;

an encryption and security module to secure user data, both while in-transit and while at-rest;

a user interface featuring an avatar touch sensor for interactive data collection and for delivering authentication prompts, including PIN input, to the user;

a feedback loop mechanism integrated within the AI module for refining and personalizing the authentication algorithms by learning from user ongoing touch patterns and behaviors, and providing real-time haptic feedback to the user, a communication mechanism to facilitate interaction between a user avatar and the AI module, including a graphical user interface within the XR environment for said user authentication;

a token flash authorization process handler that manages generation and validation of security tokens, including invalidating previous tokens and generating new tokens for subsequent authentications;

a payment and transaction validation interface that interfaces with a payment gateway or cryptocurrency network to validate and process transactions post-authentication;

a pattern detection and learning processor within the AI module that processes metadata to detect patterns indicative of fraudulent behavior and incorporates new user interaction data into the UBP after each authentication event;

a multi-factor authentication verifier utilizing the HCI component to combine analyzed touch interaction data with at least one other authentication factor for enhanced security;

an integrated transaction initiator within the XR environment operative to trigger the token flash authorization process in response to a financial transaction initiated by the user, wherein the communication mechanism is facilitated by a pop-up window on the XR environment, which provides latitude and longitude in decimal format or X,Y,Z coordinates using target navigation; and a system operation controller configured to manage the AI module's continuous learning process, ensuring dynamic adaptation of the authentication algorithms based on a feedback loop that assesses accuracy and robustness of user touch inputs over time, and to maintain functionality of the system within the XR environment.

2. A method for authenticating users within Extended Reality (XR) environments, comprising the steps of:

initializing an autonetics true touch sensation engine within the XR environment to capture tactile user interactions with an avatar interface;

activating an artificial intelligence (AI) module to extract and analyze syngeneic avatar behavior metadata based on the tactile user interactions;

generating a unique behavioral profile (UBP) for the user by processing extracted metadata through the AI module;

comparing, in real-time, current user interactions with pre-established UBP via Hybrid Capture Input (HCI) technology to verify user identity;

conducting a secure token flashing process when user authentication is required, facilitated by the AI module;

triggering, by an integrated transaction initiator within the XR environment, the secure token flashing process in response to a financial transaction initiated by the user, wherein a communication mechanism facilitates interaction between a user avatar and the AI module, the communication mechanism being facilitated by a pop-up window on the XR environment, which provides latitude and longitude in decimal format or X,Y,Z coordinates using target navigation:

storing transaction and authentication records in a secure data repository;

encrypting sensitive user data using an encryption and security module to ensure data privacy within the XR environment, wherein the autonetics true touch sensation engine incorporates cybernetic and haptic sensory technology and draws reference from a cybernetic hand for perception and action, as well as induction of haptic sensation in a physical hand through a humanoid robot avatar; and adapting authentication algorithms dynamically within the AI module based on a feedback loop that assesses the user's ongoing touch patterns and behaviors.

3. The method of claim 2, wherein extraction further involves collecting data from a plurality of biometric sensors integrated within the XR environment, including at least one of facial recognition, speech pattern analysis, and gesture tracking sensors.

4. The method of claim 3 further comprising the step of: prompting the user for authentication via a graphical user interface within the XR environment, which requires input of a personal identification number (PIN) before initiating the secure token flashing process.

5. The method of claim 4, wherein the HCI technology includes analyzing force, duration, and pattern of user touch interactions with the avatar interface.

6. The method of claim 5, wherein the step of conducting a secure token flashing process includes invalidating a previous security token and generating a new token, which is then communicated to the user for subsequent authentication events.

7. The method of claim 6, wherein the step of storing transaction and authentication records in a secure data repository includes categorizing the records based on transaction type, user identity, and authentication outcome.

8. The method of claim 7, further including the step of providing real-time user feedback during authentication via haptic feedback mechanisms embedded within the XR environment.

9. The method of claim 8, wherein the step of dynamically adapting authentication algorithms is based on a continuous learning process that incorporates new user interaction data into the UBP after each authentication event.

10. The method of claim 9, including the step of interfacing with a payment gateway or cryptocurrency network to validate the transaction post-authentication.

11. The method of claim 10, wherein the step of activating the AI module to extract and analyze metadata further includes processing the metadata to detect and learn from patterns indicative of fraudulent behavior.

12. The method of claim 11, further comprising the step of utilizing the HCI technology to perform multi-factor authentication by combining the analyzed touch interaction data with at least one other authentication factor.

13. A system for dynamic authentication in Extended Reality (XR) environments, the system comprising:

an autonetics true touch sensation engine capable of authenticating a user's identity through analysis of touch and sensation data obtained during user-avatar interaction within the XR environment;

an artificial intelligence (AI) module configured to process behavioral and biometric data to extract syngeneic avatar behavior metadata and to dynamically initiate a token flashing process based on predefined security events;

a Hybrid Capture Input (HCI) technology component that aligns and verifies user interaction patterns with a pre-established Unique Behavioral Profile (UBP) for identity confirmation;

a data repository that stores and manages the extracted metadata, user information, authentication records, and transaction details;

an encryption and security module responsible for encryption of sensitive data and maintenance of privacy and security within the XR environment;

a user interface, including an avatar touch sensor, which facilitates collection of behavioral data and delivery of authentication prompts to the user;

a feedback loop mechanism within the AI module that refines authentication algorithms by learning from user touch patterns and behaviors over time, wherein the HCI technology component employs a combination of expression-based, body part/biometric-based, wearable-based, and true touch sensation-based authentication methods;

a token flash authorization process handler that manages generation and validation of security tokens within the XR environment; and an integrated transaction Initiator within the XR environment operative to trigger the token flashing process in response to a financial transaction initiated by the user, wherein a communication mechanism facilitates interaction between a user avatar and the AI module, the communication mechanism being facilitated by a pop up window on the XR environment, which provides latitude and longitude in decimal format or X,Y,Z coordinates using target navigation.

14. The system of claim 13, wherein the AI module utilizes machine learning techniques to adaptively enhance precision of the UBP based on continuous user interaction data.

15. The system of claim 14, wherein the AI module is further configured to initiate the token flashing process when a financial transaction is attempted by the user within the XR environment.

16. The system of claim 15, wherein the HCI technology component employs a combination of expression-based, body part/biometric-based, wearable-based, and true touch sensation-based authentication methods.

17. The system of claim 16, wherein the AI module analyzes the syngeneic avatar behavior metadata based on data collection methods including at least one of user interaction logging, user feedback and surveys, behavioral biometric sensors, user profiles, and behavioral analysis during training.

18. The system of claim 17, wherein the data repository includes a synthetic AI metadata store for managing metadata information related to authentication processes.

19. The system of claim 18, wherein the feedback loop mechanism is further configured to dynamically adapt authentication algorithms based on unique touch signatures identified during user interactions with the avatar touch sensor interface.

20. The system of claim 19, wherein the encryption and security module handles data encryption using asymmetric encryption to ensure the security and privacy of user sensitive information.

* * * * *